United States Patent
Ichikawa

(10) Patent No.: US 11,671,426 B2
(45) Date of Patent: Jun. 6, 2023

(54) INFORMATION PROCESSING APPARATUS AND NON-TRANSITORY COMPUTER READABLE MEDIUM OF PERFORMING SETTING FOR MULTI-STEP AUTHENTICATION

(71) Applicant: FUJIFILM Business Innovation Corp., Tokyo (JP)

(72) Inventor: Takehiro Ichikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 352 days.

(21) Appl. No.: 17/037,724

(22) Filed: Sep. 30, 2020

(65) Prior Publication Data
US 2021/0243187 A1 Aug. 5, 2021

(30) Foreign Application Priority Data
Feb. 3, 2020 (JP) .............................. JP2020-016054

(51) Int. Cl.
*H04L 9/40* (2022.01)
*G06Q 20/38* (2012.01)
*G06Q 20/14* (2012.01)

(52) U.S. Cl.
CPC ......... *H04L 63/0876* (2013.01); *G06Q 20/14* (2013.01); *G06Q 20/3821* (2013.01); *H04L 63/102* (2013.01); *H04L 63/105* (2013.01); *H04L 63/20* (2013.01)

(58) Field of Classification Search
CPC . H04L 63/0876; H04L 63/102; H04L 63/105; H04L 63/20; G06Q 20/14; G06Q 20/3821
See application file for complete search history.

(56) References Cited

U.S. PATENT DOCUMENTS

| | | | |
|---|---|---|---|
| 8,209,746 B2 | 6/2012 | Tamai et al. | |
| 2009/0006652 A1* | 1/2009 | Kasatani | H04N 1/00204 709/248 |
| 2012/0266224 A1 | 10/2012 | Gruschka et al. | |
| 2013/0286420 A1* | 10/2013 | Tonegawa | H04N 1/44 358/1.13 |
| 2018/0097789 A1* | 4/2018 | Murthy | H04L 63/0227 |
| 2019/0018944 A1* | 1/2019 | Sakamoto | G06T 7/00 |
| 2020/0134168 A1* | 4/2020 | Hwang | G06F 21/46 |

FOREIGN PATENT DOCUMENTS

| | | |
|---|---|---|
| JP | 4654329 | 3/2011 |
| JP | 2013509840 | 3/2013 |

OTHER PUBLICATIONS

David Strom, "Exploring multifactor authentication benefits and technology", Published Jan. 2019, Retrieved From https://www.techtarget.com/searchsecurity/feature/The-fundamentals-of-MFA-Multifactor-authentication-in-the-enterprise (Year: 2019).*

* cited by examiner

*Primary Examiner* — Chau Le
(74) *Attorney, Agent, or Firm* — JCIPRNET

(57) ABSTRACT

An information processing apparatus includes a memory storing, in an associated form, a unit of authentication and multi-step authentication corresponding to the unit and one or more processors configured to, when a type of the authentication of an authentication step in the multi-step authentication is to be set, display a unit of the type serving as a setting target on a display in a manner such that the unit of the type serving as the setting target is selectable.

10 Claims, 16 Drawing Sheets

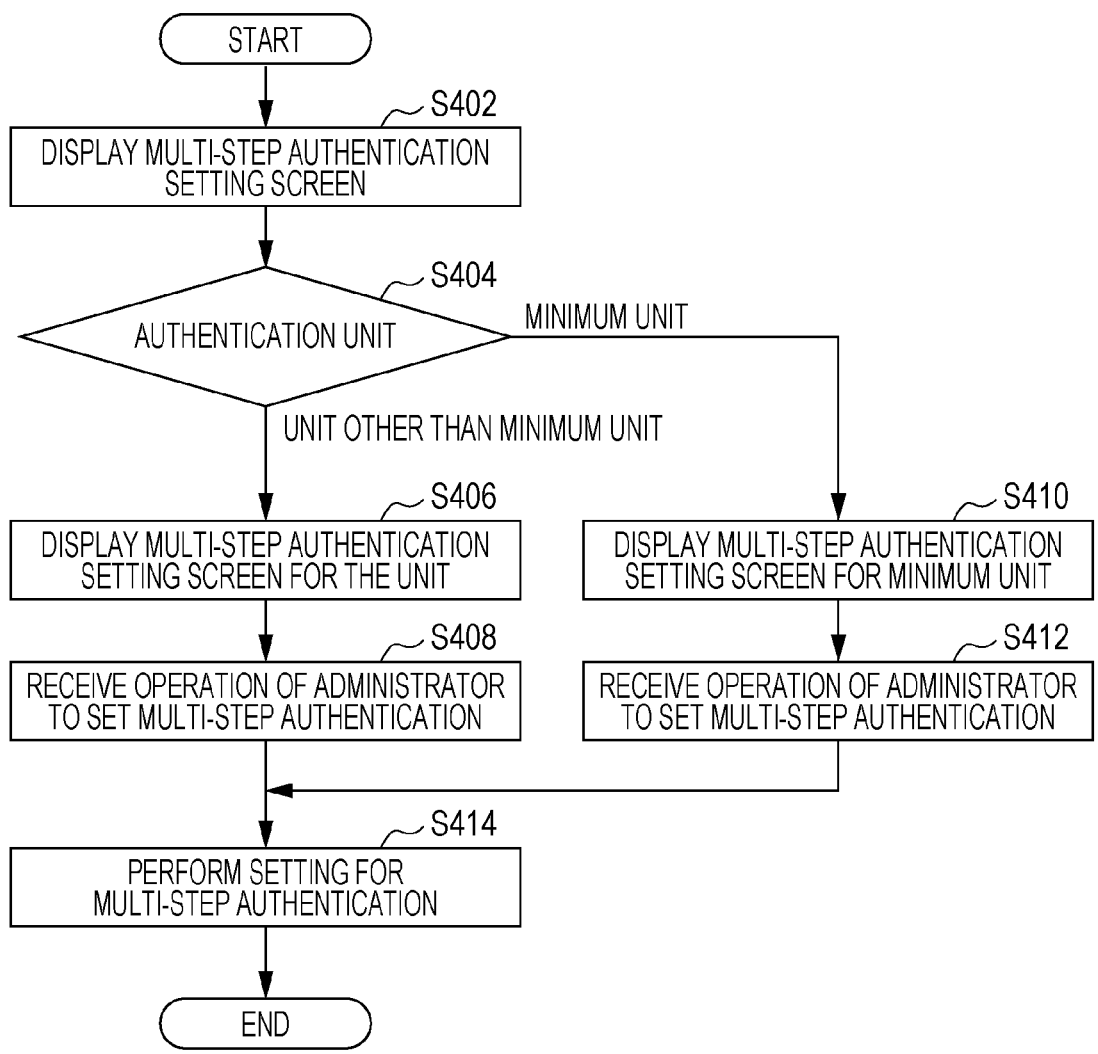

FIG. 11

| 1105 | 1110 | 1115 | 1120 | 1125 | |
|---|---|---|---|---|---|
| CLIENT ID | NAME | TYPE | DEVICE AUTHENTICATION APPARATUS A | DEVICE AUTHENTICATION APPARATUS B | ... |
| | | | | | |

| 1205 | 1210 | 1215 | 1220 | 1225 | |
|---|---|---|---|---|---|
| AUTHENTICATION UNIT | INDIVIDUAL/ TYPE | NUMBER OF STEPS | AUTHENTICATION METHOD A | AUTHENTICATION METHOD B | ... |
| | | | | | |

| AUTHENTICATION SERVICE APPARATUS ID (1605) | AUTHENTICATION LEVEL (1610) |
|---|---|
|  |  |

| SERVICE PROVIDER APPARATUS ID (1655) | AUTHENTICATION LEVEL (1660) |
|---|---|
|  |  |

| AUTHENTICATION LEVEL (1705) | NUMBER OF STEPS (1710) | AUTHENTICATION METHOD A (1715) | AUTHENTICATION METHOD B (1720) | ... |
|---|---|---|---|---|
|  |  |  |  |  |

1700

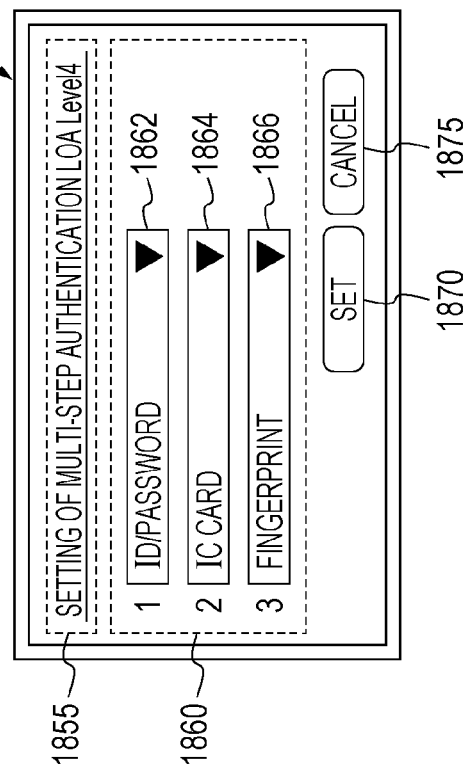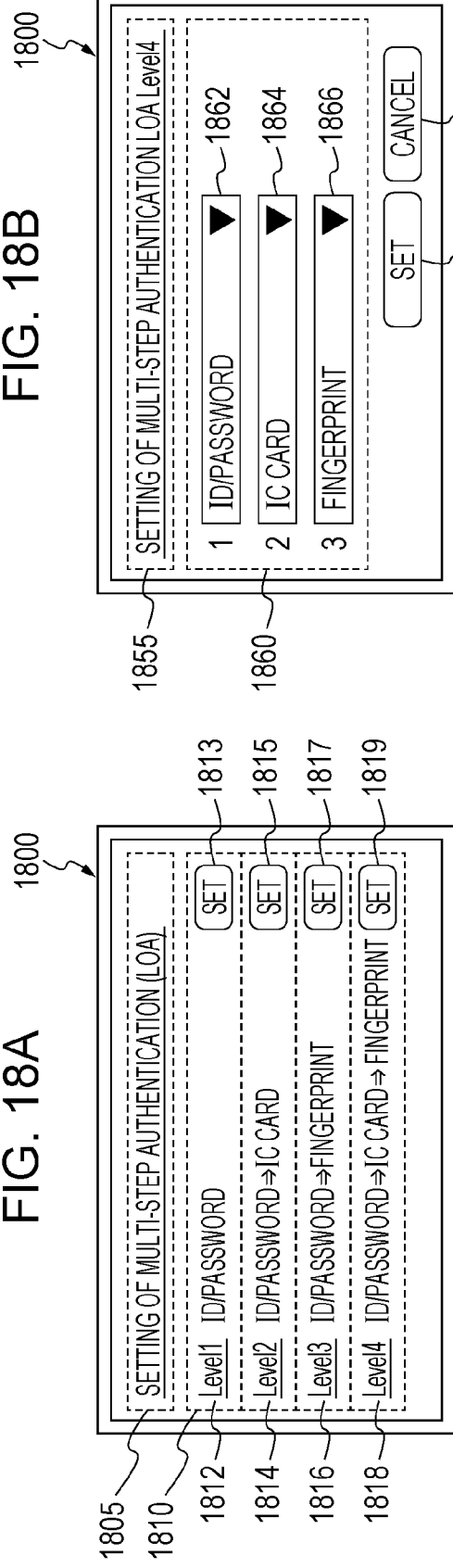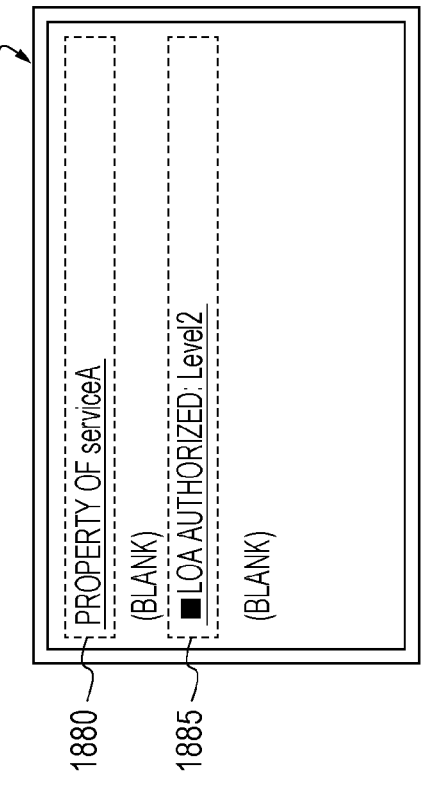

INFORMATION PROCESSING APPARATUS AND NON-TRANSITORY COMPUTER READABLE MEDIUM OF PERFORMING SETTING FOR MULTI-STEP AUTHENTICATION

CROSS-REFERENCE TO RELATED APPLICATIONS

This application is based on and claims priority under 35 USC 119 from Japanese Patent Application No. 2020-016054 filed Feb. 3, 2020.

BACKGROUND

(i) Technical Field

The present disclosure relates to an information processing apparatus and a non-transitory computer readable medium.

(ii) Related Art

Japanese Patent No. 4654329 discloses a user authentication system to force-present contents to a user. The user authentication system is a content presentation type authentication system. The content-presentation type authentication system displays multiple pattern elements arranged in a specific presentation pattern to a user who is to be authenticated. The content-presentation type authentication system causes a client to perform user authentication by using as a password of the user a one-time password derivation rule that is applied to a pattern element at a specific location contained in the presentation pattern. The content-presentation type authentication system thus causes the client to perform content-presentation type user authentication by force-presenting contents to the user during the user authentication. The content-presentation type authentication system includes an authentication service provider server and the client. The authentication service provider server manages a user ID, password, multiple pieces of content data, and content identifications (IDs) thereof and provides content associated authentication information to the user. The client includes a content-presentation type user authentication program and a processor.

Japanese Unexamined Patent Application Publication (Translation of PCT Application) No. 2013-509840 discloses a user authentication method that accesses from a client to a server via a packet-based network using a one-time password. The client has first confidential information. The server includes a database that stores second confidential information and a user name that is selected and associated with the second confidential information. The user authentication method includes a step in which the client provides to the server the second confidential information associated with the first confidential information and to the database the second confidential information and the selected user name. The user authentication method further includes a step in which a challenge encoded by the server and including random data is transmitted from the server to the client. The user authentication method further includes a step in which the client computes a one-time password using the second confidential information and the random data decoded from the challenge. The user authentication method further includes a step in which the client accesses the server by submitting the one-time password and the selected user name.

Some information processing apparatuses set the type of each authentication in a multi-step authentication. Users have typically difficulty in selecting the unit of authentication in a configuration where the type of the authentication is uniformly fixed.

SUMMARY

Aspects of non-limiting embodiments of the present disclosure relate to providing an information processing apparatus and a non-transitory computer readable medium selecting a unit of authentication in setting the type of each authentication in a multi-step authentication.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory storing, in an associated form, a unit of authentication and multi-step authentication corresponding to the unit and one or more processors configured to, when a type of the authentication of an authentication step in the multi-step authentication is to be set, display a unit of the type serving as a setting target on a display in a manner such that the unit of the type serving as the setting target is selectable.

BRIEF DESCRIPTION OF THE DRAWINGS

Exemplary embodiment of the present disclosure will be described in detail based on the following figures, wherein:

FIG. 4 is a flowchart illustrating a process example of the exemplary embodiment;

FIG. 5 illustrates a data structure of an authentication unit and authentication method management table;

FIG. 11 illustrates a data structure of a client management table;

FIG. 12 illustrates a data structure of a client authentication unit and authentication method management table;

FIGS. 16A and 16B illustrate a data structure of an authentication service apparatus to authentication level table and a service provider apparatus to authentication level table;

FIG. 17 illustrates a data structure of an authentication level and authentication method management table;

FIGS. 18A through 18C illustrate a process example of the exemplary embodiment;

DETAILED DESCRIPTION

Exemplary embodiment of the disclosure is described with reference to the drawings.

Figure 1:
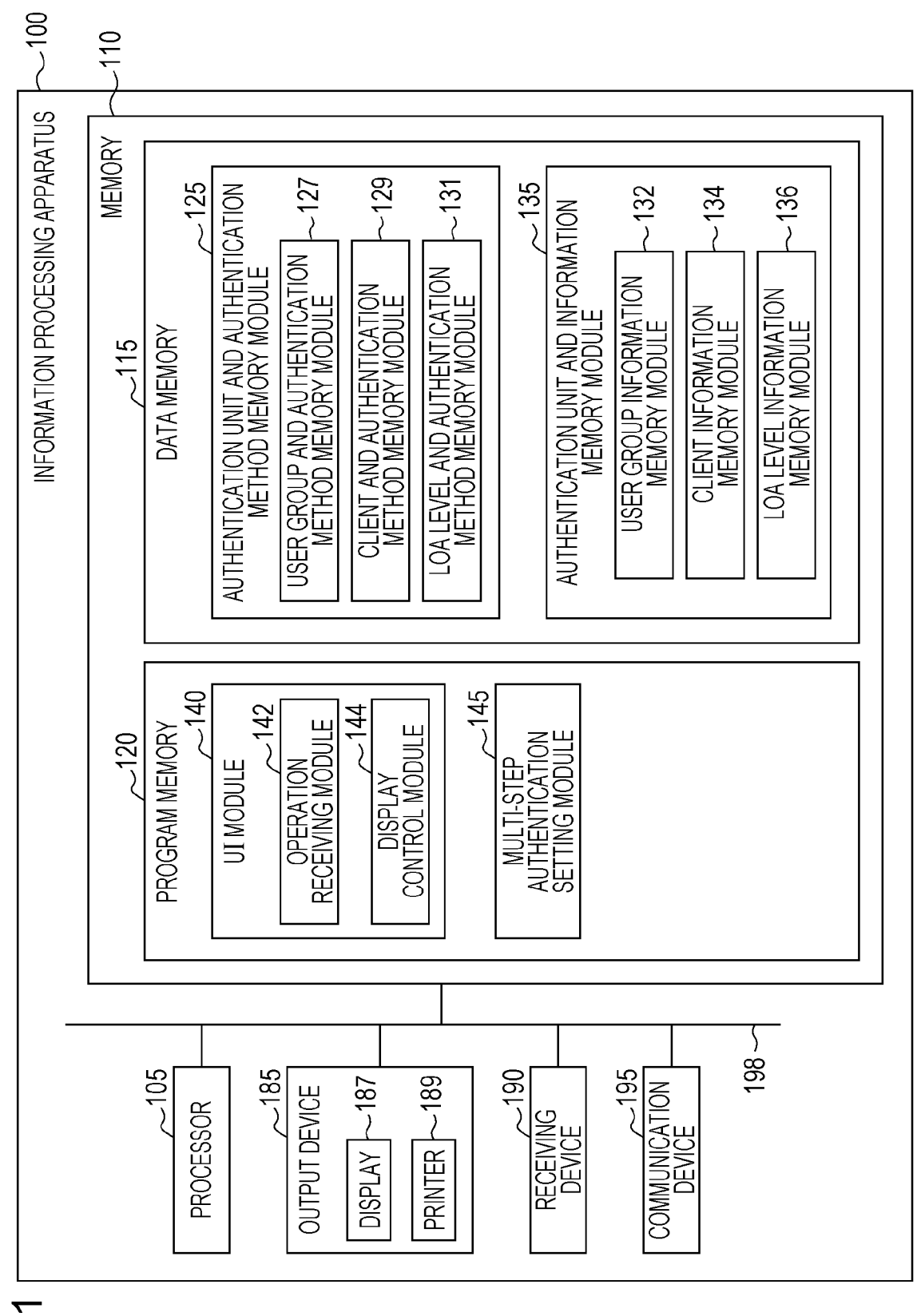
FIG. 1 illustrates a conceptual modular configuration of an exemplary embodiment.

FIG. 1 illustrates a conceptual modular configuration of the exemplary embodiment. The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of a system, method, and computer programs for causing the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to mean that a determination as to whether something is A is performed and that if something is determined as A, an action B is to be taken. The statement becomes meaningless if the determination as to whether something is A is not performed. If a discussion is made of events "A, B, and C," the discussion is applicable to at least one of the events "A, B, and C" unless otherwise noted. For example, the discussion is applicable to the case in which only the event A is selected.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment has a function of setting the type of each authentication step in the multi-step authentication. Referring to FIG. 1, the information processing apparatus 100 includes at least a processor 105 and memory 110 and further includes a bus 198 through which data is exchanged therebetween. The information processing apparatus 100 may further include an output device 185, receiving device 190, and communication device 195. Data is exchanged via the bus 198 among the processor 105, memory 110, output device 185, receiving device 190, and communication device 195.

The block diagram in FIG. 1 also illustrates a hardware configuration of a computer that implements the exemplary embodiment. The computer hardware executing a program of the exemplary embodiment is a computer illustrated in FIG. 1 and is typically a computer, such as a personal computer or server. Specifically, the information processing apparatus 100 employs the processor 105 and the memory 110 as a storage device.

One or more processors 105 may be employed. The processor 105 may include a central processing unit (CPU) or a microprocessor. If multiple processors 105 are employed, they may be a tightly or loosely coupled multiprocessor. For example, a single processor 105 may include multiple processor cores. Alternatively, a system including multiple computers linked via a communication network and functioning like a virtual single computer may be employed. The system may be a loosely coupled multiprocessor that is constructed as a cluster system or a computer cluster. The processor 105 executes a program on the program memory 120.

The memory 110 may include a semiconductor memory, such as a register or a cache memory in the processor 105 or a memory, such as a random-access memory (RAM) or a read-only memory (ROM). The memory 110 may also be an internal memory device, such a hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, memory card or other external storage device or other auxiliary memory device.

The memory 110 may also be a memory device of a server connected to the information processing apparatus 100 via a communication network.

The memory 110 includes a data memory 115 storing data and a program memory 120 storing programs. The program memory 120 and the data memory 115 may store programs of the modules illustrated in FIG. 1, programs such as an operating system to start up the computer, and data, such as parameters that appropriately vary in the execution of the modules.

The output device 185 includes a display 187 and printer 189. The display 187 may be a liquid-crystal display, organic electroluminescent (EL) display, or three-dimensional display and displays, in text or image, process results from the processor 105 and data on the data memory 115. The printer 189 may be a printer or a multi-function device and prints the process results from the processor 105 and data on the data memory 115. The output device 185 may also include a speaker and actuator to vibrate the device.

The receiving device 190 receives data responsive to user operation on a keyboard, mouse, microphone, camera (including eye-gaze detection camera) or other device or receives image data generated in response to scanner reading operation.

A touch screen serving the functions of both the display 187 and the receiving device 190 may be used. In such a case, without the physical presence of keys, the keyboard function may be implemented by drawing a keyboard (called a software keyboard or a screen keyboard) on the touch screen using software.

The display 187 and receiving device 190 are used as a user interface.

The communication device 195 is a communication network interface used to connect to another apparatus via a communication network.

The exemplary embodiment related to a computer program is implemented when the computer program as software is read onto the program memory 120 as a hardware resource and the software and hardware cooperate with each other.

The hardware configuration in FIG. 1 is illustrated for exemplary purposes only. The exemplary embodiment is not limited to the configuration illustrated in FIG. 1 and is acceptable as long as the configuration implements the modules of the exemplary embodiment. For example, the processor 105 may include a graphics processing unit (GPU) (including general-purpose computing on graphics processing unit (GPGPU)). Part of the modules may be implemented by a dedicated hardware resource (such as application specific integrated circuit (ASIC)) that executes or field-programmable gate array (FPGA) that is reconfigurable integrated circuit. Part of the modules may be in an external system that is connected to the information processing apparatus 100 via a communication network. Multiple of the system in FIG. 1 may be operatively coupled via a communication network. The system in FIG. 1 may be incorporated in a personal computer, portable information communication apparatus (such as cellular phone, smart phone, mobile device, or wearable computer), information appliance, robot, copier, fax, scanner, printer, or multi-function apparatus (an image processing apparatus having at least two of scanner function, printer function, copier function, and fax function).

The processor 105 is connected to the memory 110, output device 185, receiving device 190, and communication device 195 via the bus 198. The processor 105 executes a process in accordance with the computer program that describes an execution sequence of each module and stored on the program memory 120. For example, in response to the event when the receiving device 190 receives user operation, the processor 105 performs the process of a module responsive to the event, causes the data memory 115 to store the process results, outputs the process results to the display 187, or transmits the process results to another apparatus by controlling the communication device 195. The user operation may include a setting operation of a type of each authentication step in a multi-step authentication and a login operation.

The memory 110 includes the data memory 115 and program memory 120 and is connected to the processor 105, output device 185, receiving device 190, and communication device 195 via the bus 198.

The data memory 115 stores an authentication unit and authentication method memory module 125 and authentication unit and information memory module 135.

The authentication unit and authentication method memory module 125 includes a user group and authentication method memory module 127, client and authentication method memory module 129, and level of assurance (LOA) level and authentication method memory module 131.

The authentication unit and authentication method memory module 125 stores, in associated form, a unit of authentication (authentication unit) and a multi-step authentication responsive to the authentication unit. For example, the authentication unit and authentication method memory module 125 stores an authentication unit and authentication management table 500 described with reference to FIG. 5.

If the authentication unit is a group to which the user belongs, the user group and authentication method memory module 127 stores information on the user and the group of the user in an associated form. For example, the user group and authentication method memory module 127 stores a user authentication unit and authentication method management table 800 described with reference to FIG. 8.

When a device is used as the group, the group having the same billing destinations and previously defined may be used. The "device" herein includes an image processing apparatus 238, such as a multi-function apparatus.

If the authentication unit is a type of a device that performs authentication, the client and authentication method memory module 129 stores, in an associated form, information on the device and the function of the device for authentication. For example, the client and authentication method memory module 129 stores a client authentication unit and authentication method management table 1200 described with reference to FIG. 12. The device performing authentication is used by a user who is to be authenticated, and the device performing authentication is hereinafter referred to as a client.

A first device performing authentication and a second device performing authorization may be separate from each other. If the authentication unit is levels held by the first device and the second device, the LOA level and authentication method memory module 131 stores the level and the type of authentication at the level in association with each other. For example, the LOA level and authentication method memory module 131 stores an authentication level and authentication method management table 1700 described with reference to FIG. 17. For example, the level may be a level of assurance (LOA) based on a standard (such as a standard specification or a defact standard).

The authentication unit and information memory module 135 includes a user group information memory module 132, client information memory module 134, and LOA level information memory module 136. The authentication unit and information memory module 135 stores information on an authentication unit.

If the authentication unit is a group to which a user belongs, the user group information memory module 132 stores information on an attribute of each user and the like. For example, the user group information memory module 132 stores a user management table 700 described with reference to FIG. 7.

If the authentication unit is the type of the device performing authentication, the client information memory module 134 stores information on an attribute of the device and like. For example, the client information memory module 134 stores a client management table 1100 described with reference to FIG. 11.

The first device performing authentication and the second device performing authorization are separate from each other and if the authentication unit is the levels held by the first device and the second device, the LOA level information memory module 136 stores a combination of the first device and the level of the first device and a combination of the second device and the level of the second device. For example, the LOA level information memory module 136 stores information on an authentication service device to authentication level table 1600 and a service provider device to authentication level table 1650 described with reference to FIGS. 16A and 16B.

The program memory 120 stores a UI module 140 and multi-step authentication setting module 145.

The UI module 140 includes an operation receiving module 142 and display control module 144. The UI module 140 performs a process related to user interface.

By controlling the receiving device 190, the operation receiving module 142 receives and transfers user operation to the display control module 144 and multi-step authentication setting module 145.

When the type of each authentication step in the multi-step authentication is to be set, the display control module 144 performs control to display the unit of a set target on the display 187 in a manner such that the unit is selectable.

The authentication unit is the group to which the user belongs, the display control module 144 may perform control to display on the display 187 the group such that the group is selectable in setting the type of authentication in each step in the multi-step authentication.

If the authentication unit is the type of the device performing authentication, the display control module 144 may perform control to display the device on the display 187 in a manner such that the device is selectable when the type of each authentication step is set in the multi-step authentication. Also, when the type of each authentication step is set in the multi-step authentication, the display control module 144 may perform control to display the type of each authentication step in the multi-step authentication on the display 187 in a manner such that the type of each authentication step is selectable in accordance with the function of the device.

The display control module 144 may display with a higher priority the type of the authentication step set in a service provided by the device.

The first device performing authentication and the second device performing authorization may be separate from each other and the authentication unit may be the levels held by the first device and the second device. The display control module 144 then performs control to display the levels on the display 187 in a manner such that the levels are selectable when the type of each authentication step in the multi-step authentication is set.

The display control module 144, when performing authentication, inquires a third-party organization of a level, acquires the level, and sets the type of the authentication step responsive to the acquired level.

The multi-step authentication setting module 145 sets the type of each authentication step in the multi-step authentication in response to user operation performed on the screen of the display 187 displayed by the display control module 144.

The type of authentication is a category of authentication. If the category of authentication is selected, the multi-step authentication setting module 145 sets the type of authentication contained in the category of authentication in accordance with a device performing authentication.

The "category of authentication" is an element used in the multi-step authentication. For example, passwords may include three types: something the user knows (authentication by knowledge); something the user has (authentication by possession), such as an IC card; and something the user is (biometric authentication), such as fingerprint.

The "type of authentication contained in the category of authentication in accordance with the device performing authentication" is the type of authentication contained in the category of a selected authentication and the type of the authentication supported by the device performing authentication. For example, the category of the selected authentication may be authentication by possession and the device performing authentication may be an image processing apparatus including a reader reading an IC card. In such a case, the type of the authentication to be set is an IC card.

Figure 2:
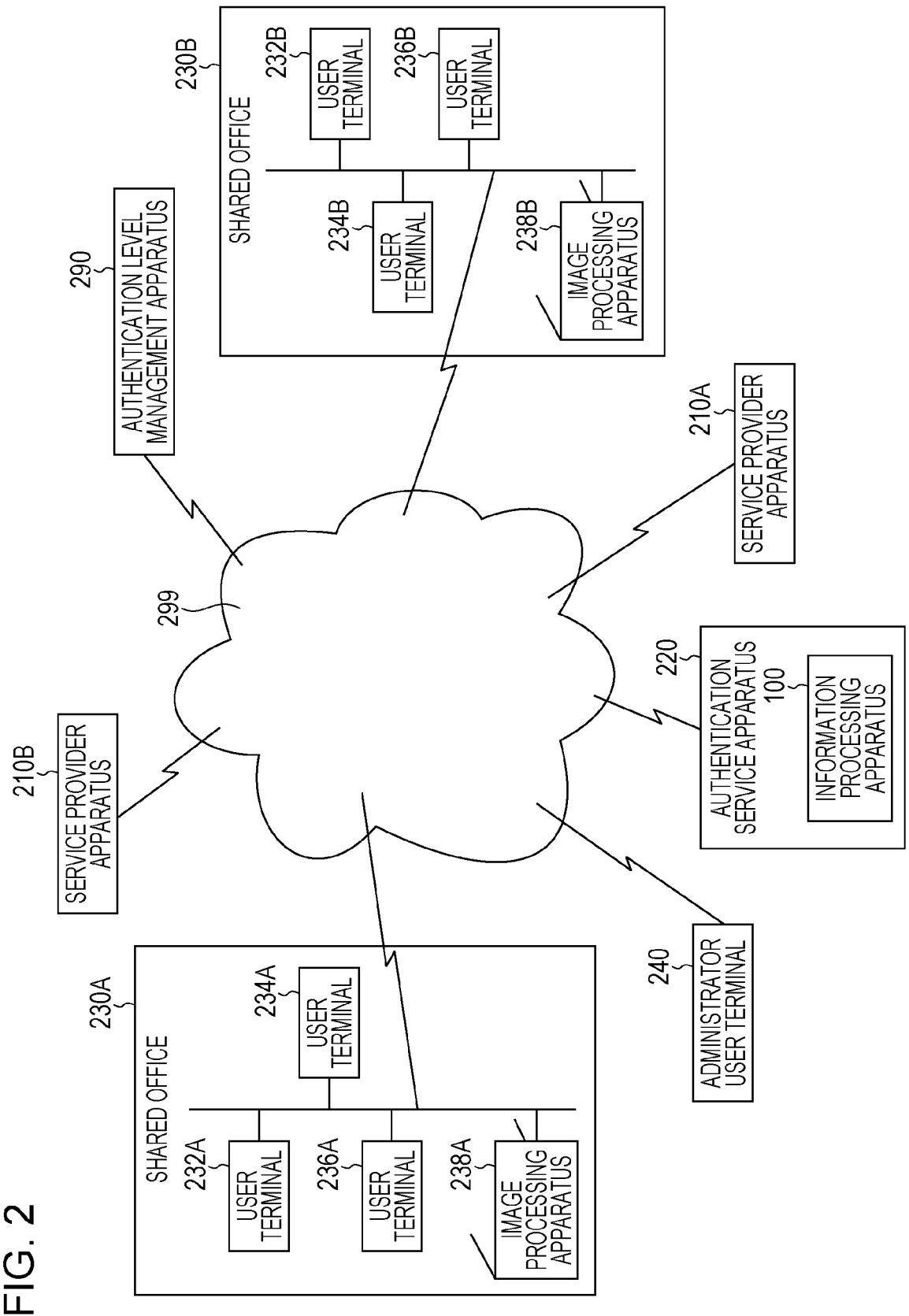
FIG. 2 illustrates a system configuration of the exemplary embodiment.

FIG. 2 illustrates a system configuration using the exemplary embodiment. An authentication service apparatus 220 includes the information processing apparatus 100. The authentication service apparatus 220 may have an identity provider (IdP) function.

A shared office 230A includes a user terminal 232A, user terminal 234A, user terminal 236A, and image processing apparatus 238A. The user terminal 232A, user terminal 234A, user terminal 236A, and image processing apparatus 238A are interconnected to each other via a communication network. A shared office 230B includes a user terminal 232B, user terminal 234B, user terminal 236B, and image processing apparatus 238B. The user terminal 232B, user terminal 234B, user terminal 236B, and image processing apparatus 238B are interconnected to each other via a communication network.

A communication network 299 interconnects for mutual communication a service provider apparatus 210A, service provider apparatus 210B, authentication service apparatus 220, administrator user terminal 240, authentication level management apparatus 290, and user terminals 232A through 236A and the image processing apparatus 238A in the shared office 230A, and user terminals 232B through 236B and the image processing apparatus 238B in the shared office 230B.

The administrator user terminal 240 is used by the administrator for authentication. The authentication service apparatus 220 is used to set the type of each authentication step in the multi-step authentication in response to administrator operation.

The communication network 299 may be a wireless network, a wired network, or a combination thereof. The communication network 299 may also be a communication infrastructure, such as the Internet or intranet. The functions of the information processing apparatus 100, service provider apparatus 210, authentication level management apparatus 290, and authentication service apparatus 220 may be implemented using a cloud service.

The authentication unit has been fixed in setting the multi-step authentication to use an application. For example, the authentication unit is set on a per user basis or on a per client basis with the client being a device performing authentication. It has been difficult to modify the unit of the authentication setting. Even if the same authentication setting is desired on the group of users, the authentication setting has been to be performed on a per user basis.

According to the exemplary embodiment, when the administrator sets the type of each authentication step in the multi-step authentication, the unit of the setting target may be modified.

Office workers of multiple different organizations, such as different companies, may be present in the shared office 230A. For example, the user terminal 232A and the user terminal 234A may belong to the same organization but the user terminal 236A may belong to another organization. When the image processing apparatus 238A is used, the type of each authentication step in the multi-step authentication is desirably the same in the setting of the multi-step authentication to users belonging to the same organization. Specifically, users belonging to an organization A (for example, the user terminal 232A and user terminal 234A) undergo authentication by knowledge, such as using a password, as the type of a first-step authentication and biometric authentication, such as using a fingerprint, in a second step authentication. A user belonging to an organization B (for example, the user terminal 236A) undergoes authentication by knowledge, such as using a password, as the type of a first step authentication and authentication by possession, such as holding an IC card in a second-step authentication. In such a case, the setting is performed in a smaller number of setting steps on a per organization basis than on a per user basis.

The setting of ID/password, the registration of fingerprint, and setting and distribution of the IC card, and the setting of authentication of each user are performed beforehand. In each setting of the multi-step authentication, the type of each authentication step in the multi-step authentication is to be performed. For example, authentication using ID/password is performed in a first step, authentication using the IC card is performed in a second step, and fingerprint authentication is performed in a third step. The setting of the multi-step authentication may use the category of authentication. For example, in the setting, the authentication by knowledge is performed in a first step, the authentication by possession is performed in a second step, and the biometric authentication is performed in a third step. In that case, a specific authentication method is determined depending on an authentication device of a client used by the user. Specifically, if the authentication by possession is set and the client used by the user includes an IC card reader, the authentication is performed using an IC card.

The clients as devices performing authentication are divided into several types. For example, an image processing apparatus 238 is enabled to receive a password and read an IC card, but does not include a device for face authentication. On the other hand, the user terminal 232 is enabled to receive a password and perform face authentication, but does not include a device for reading an IC card. In such a case, if the image processing apparatus 238 is selected, the inputting of the password and the reading of the IC card may be set as the type of authentication. If the user terminal 232 is selected, the inputting of the password and the face authentication may be set the type of authentication.

The first device performing authentication and second device performing authorization may be separate from each other. The authentication refers to identifying who the user is and the authorization means that the user is permitted to use a device in accordance with the right of the user. Referring to FIG. 2, the first device is the authentication service apparatus 220 and the second device is the service provider apparatus 210. The authentication level of the first device and the authentication level of the second device are managed by the authentication level management apparatus 290. Level selection is performed such that the first and second devices agree with each other in authentication level and the type of each authentication step in the multi-step authentication is thus set. The authentication levels of the service provider apparatus 210 and the authentication service apparatus 220 may be acquired by inquiring the authentication level management apparatus 290.

Figure 3:
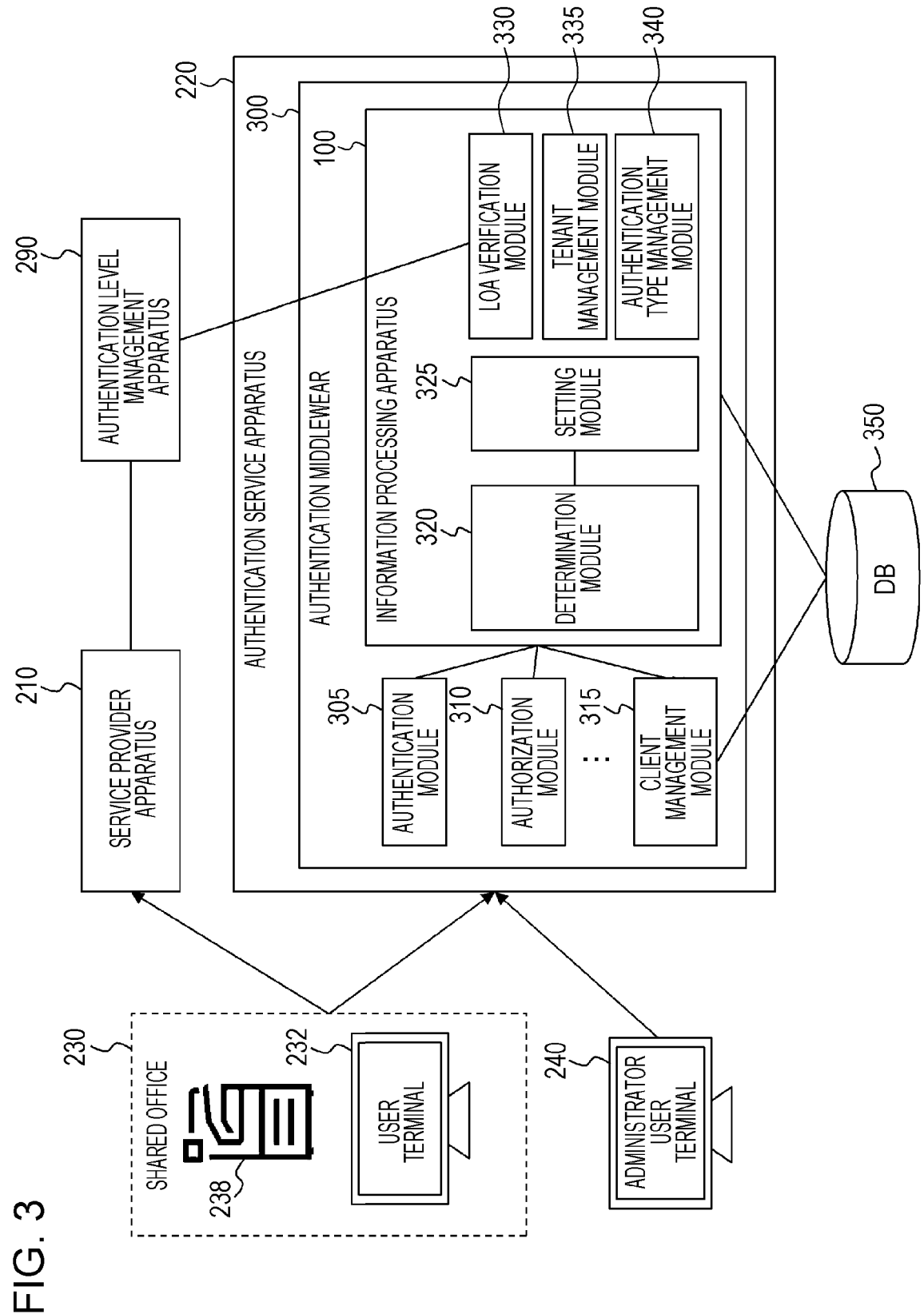
FIG. 3 illustrates another conceptual modular configuration of the exemplary embodiment.

FIG. 3 illustrates another conceptual modular configuration of the exemplary embodiment. The service provider apparatus 210 provides service in cooperation with the authentication service apparatus 220.

The authentication level management apparatus 290 manages the authentication levels of the service provider apparatus 210 and authentication service apparatus 220 and has, for example, a trust framework provider (TFP) function.

The authentication service apparatus 220 includes an authentication middleware 300 and is connected to the user terminals 232 and the image processing apparatus 238 in the shared office 230 and the administrator user terminal 240. The authentication service apparatus 220 manages users and has the IdP function.

The authentication middleware 300 includes the information processing apparatus 100, authentication module 305, authorization module 310, and client management module 315. The authentication middleware 300 has an authentication function and is somewhere between an operating system (OS) performing basic control of a computer and applications performing each process.

The authentication module 305 is connected to the information processing apparatus 100. The authentication module 305 has a function related to authentication.

The authorization module 310 is connected to the information processing apparatus 100. The authorization module 310 has a function related to authorization.

The client management module 315 is connected to the information processing apparatus 100 and database (DB) 350. The client management module 315 has a function managing clients.

The information processing apparatus 100 includes a determination module 320, setting module 325, LOA verification module 330, tenant management module 335, and authentication type management module 340. The information processing apparatus 100 is connected to the authentication module 305, authorization module 310, client management module 315, and DB 350. The information processing apparatus 100 has a function setting and determining the multi-step authentication. For example, the information processing apparatus 100 sets, as a unit, such as a group of users or a client, services of multiple authentication methods including a one-time password authentication and ID card authentication.

The determination module 320 is connected to the setting module 325. The determination module 320 determines which multi-step authentication to apply when the user logs in.

The setting module 325 is connected to the determination module 320. The setting module 325 manages users, groups of users, and the authentication type setting of the multi-step authentication at each level of assurance (LOA).

The LOA verification module 330 is connected the authentication level management apparatus 290. The LOA verification module 330 verifies a target service for the authentication level management apparatus 290 (the service provider apparatus 210 in FIG. 3) and the LOA level of the authentication service apparatus 220.

The tenant management module 335 manages information on the users and the group to which the users belong.

The authentication type management module 340 manages the authentication type definable according to service unit or unit of client type.

The DB 350 is connected to the information processing apparatus 100 and client management module 315. The DB 350 manages information on the users and information on the clients and provides these pieces of information to the authentication service apparatus 220.

The service provider apparatus 210 is connected to the user terminals 232 and image processing apparatus 238 in the shared office 230 and the authentication level management apparatus 290.

The user terminals 232 and image processing apparatus 238 in the shared office 230 are connected to each of the service provider apparatus 210 and authentication service apparatus 220.

The administrator user terminal 240 is connected to the authentication service apparatus 220.

The authentication level management apparatus 290 is connected to the service provider apparatus 210 and LOA verification module 330.

FIG. 4 is a flowchart illustrating a process example of the exemplary embodiment.

The process starts.

In step S402, the setting screen of the multi-step authentication is displayed.

In step S404, the authentication unit is determined. If the authentication unit is other than a minimum unit, the process proceeds to step S406. If the authentication unit is the minimum unit, the process proceeds to step S410. The case in which the authentication unit is other than the minimum unit corresponds to when a group including multiple users is used as the authentication unit, when the type of clients receiving an input for authentication is used as the authentication unit, or when an authentication level acquired from the authentication level management apparatus 290 is used as the authentication unit. The case of the minimum unit corresponds to when the authentication unit is an individual user, when the authentication unit is a client receiving an input for authentication is used, or when no authentication level is used.

In step S406, a multi-step authentication setting screen is displayed for the unit.

In step S408, an operation of the administrator to set the multi-step authentication is received.

In step S410, the multi-step authentication setting screen for the minimum unit is received.

In step S412, an operation of the administrator to set the multi-step authentication is received.

In step S414, a multi-step authentication setting is performed.

The process thus ends.

The authentication unit and authentication management table 500 is created in accordance with the process of the flowchart in FIG. 4. The authentication unit and authentication management table 500 is stored on the authentication unit and authentication method memory module 125.

FIG. 5 illustrates a data structure of the authentication unit and authentication management table 500. The authentication unit and authentication management table 500 includes an authentication unit column 505, number of steps column 510, authentication method A column 515, and authentication method B column 520. The authentication unit column 505 stores a unit of a setting target in the multi-step authentication. The number of steps column 510 stores the number of steps of authentication in the multi-step authentication. The authentication method A column 515 stores an authentication method A in a first step. The authentication method B column 520 stores an authentication method B in a second step. If the number of steps is three or more, columns identical the authentication method A column 515 (or the authentication method B column 520) are added.

Figure 6:
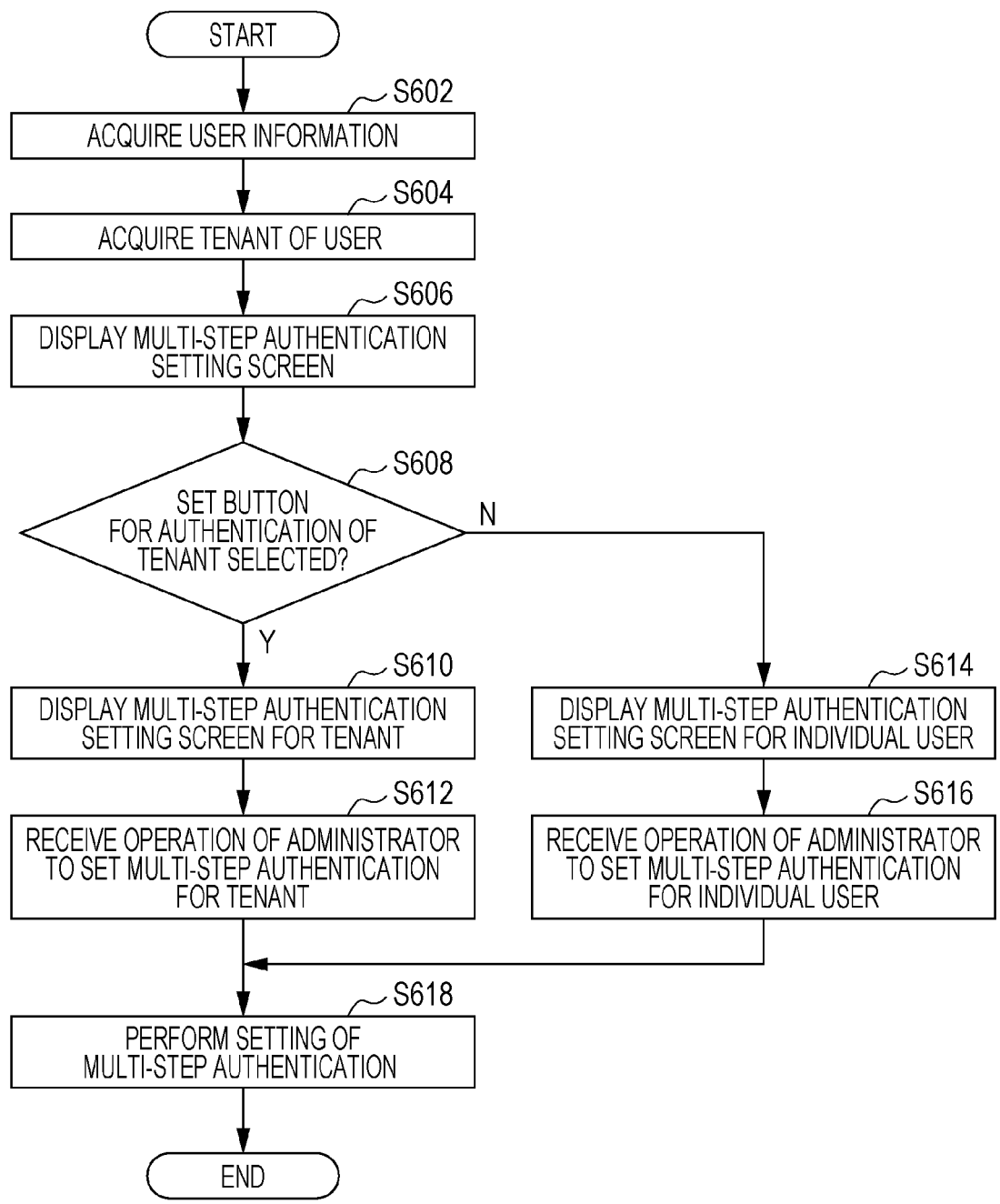
FIG. 6 is a flowchart illustrating a process example of the exemplary embodiment.

FIG. 6 is a flowchart illustrating a process example of the exemplary embodiment. The setting of the multi-step authentication is performed to users (including an individual and a group including individuals).

The process starts.

In step S602, user information is acquired. For example, information on a target user is acquired from the user management table 700. The user management table 700 is stored on the user group information memory module 132.

Figure 7:
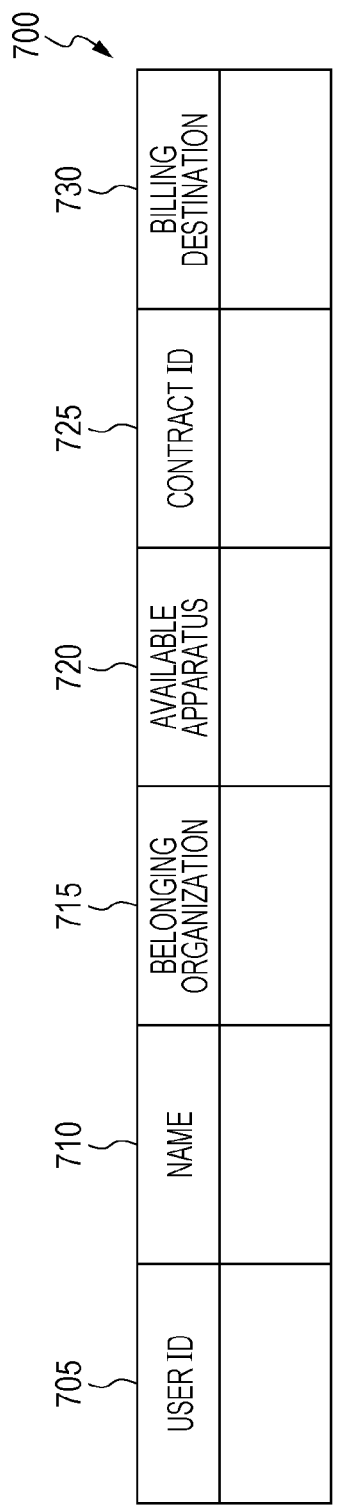
FIG. 7 illustrates a data structure of a user management table.

FIG. 7 illustrates a data structure of the user management table 700. The user management table 700 includes a user ID column 705, name column 710, belonging organization column 715, available apparatus column 720, contract ID column 725, and billing destination column 730.

The user ID column 705 stores information uniquely identifying a user in the exemplary embodiment. The name column 710 stores the name of the user. The belonging organization column 715 stores an organization to which the user belongs (hereinafter referred to as a tenant). The tenant is an example of the group to which the user belongs. The available apparatus column 720 stores information on an apparatus which is available to the user. For example, the available apparatus may be a multi-function apparatus, such as the image processing apparatus 238. In accordance with the exemplary embodiment, the contract ID column 725 stores information uniquely identifying a contract (specifically, a contract ID). For example, the contract is a utilization contract of a device listed on the available apparatus column 720. The billing destination column 730 stores a billing destination. Contents in the billing destination column 730 are determined by the contract in the contract ID column 725 and may be an individual user, an organization listed in the belonging organization column 715, or another group.

In step S604, the tenant to which the user belongs is acquired.

In step S606, the multi-step authentication setting screen is displayed.

In step S608, it is determined whether a set button to authenticate the tenant is selected. If the tenant is selected, the process proceeds to step S610; otherwise, the process proceeds to step S614.

In step S610, the multi-step authentication setting screen for the tenant is displayed.

In step S612, the operation of the administrator to set the multi-step authentication on the tenant is received.

In step S614, the multi-step authentication setting screen is displayed for the individual user.

In step S616, the operation of the administrator to set the multi-step authentication for the individual user is received.

In step S618, the multi-step authentication is set.

The process then ends.

The user authentication unit and authentication method management table 800 is created in accordance with the process described in the flowchart in FIG. 6. The user authentication unit and authentication method management table 800 is stored on the user group and authentication method memory module 127.

Figure 8:
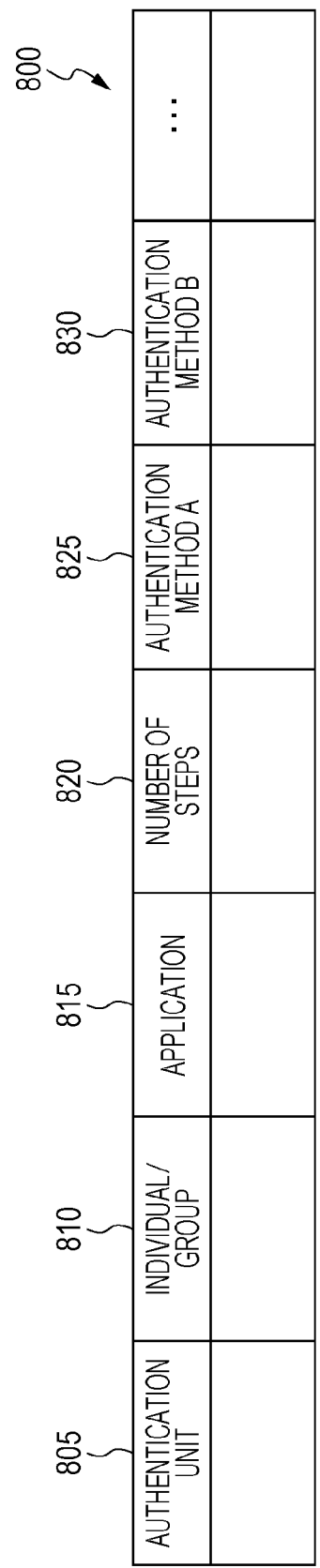
FIG. 8 illustrates a data structure of a user authentication unit and authentication management table.

FIG. 8 illustrates a data structure of the user authentication unit and authentication method management table 800. The user authentication unit and authentication method management table 800 includes an authentication unit column 805, individual/group column 810, application column 815, number of steps column 820, authentication method A column 825, and authentication method B column 830. The authentication unit column 805 stores an authentication unit. For example, the authentication unit is information uniquely identifying the tenant or user ID. The individual/group column 810 stores information on whether the users are an individual or a group. The application column 815 stores an application serving as an authentication target. The number of steps column 820 stores the number of steps in the multi-step authentication. The authentication method A column 825 stores an authentication method A in the first step. The authentication method B column 830 stores an authentication method B in the second step. If three or more steps are used, columns identical to the authentication method A column 825 (or the authentication method B column 830) are added.

Figure 9B:
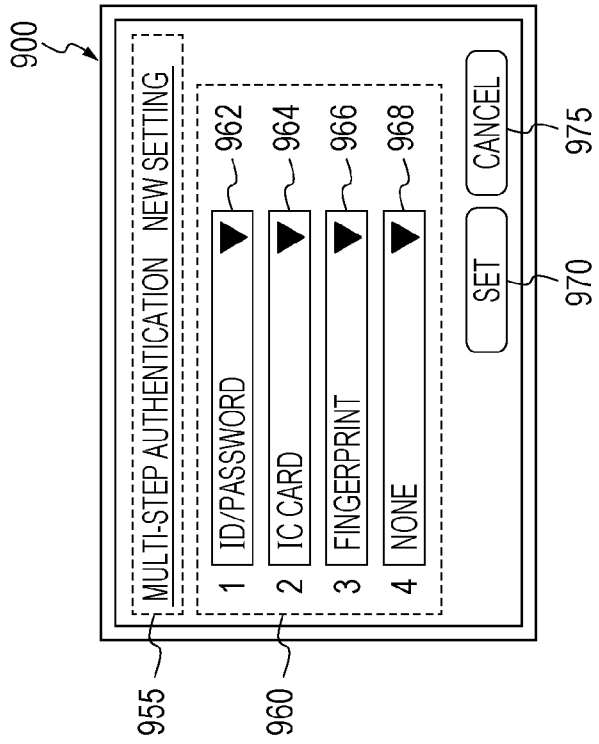
FIGS. 9A and 9B illustrate a process example of the exemplary embodiment.
Figure 9A:
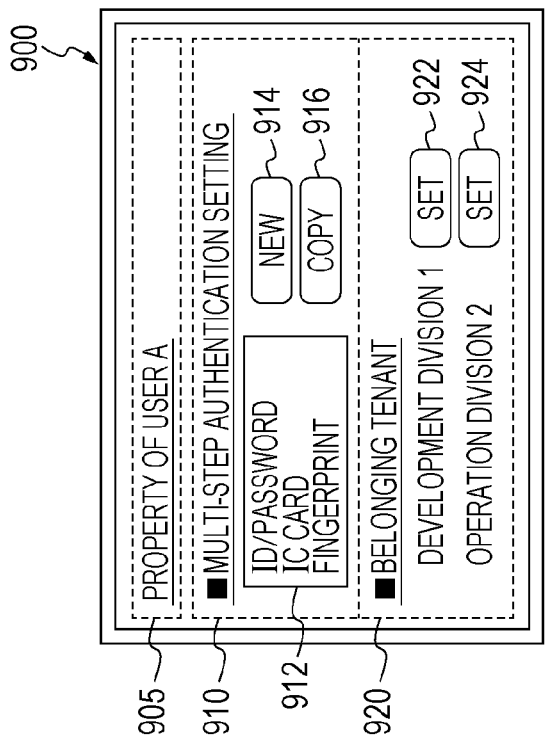

FIGS. 9A and 9B illustrate a process example of the exemplary embodiment.

FIG. 9A illustrates the multi-step authentication setting screen for a user A for use of an application.

A screen 900 includes a title column 905, individual user multi-step authentication setting region 910, and tenant multi-step authentication setting region 920.

The individual user multi-step authentication setting region 910 displays an authentication method display column 912, new button 914, and copy button 916.

The tenant multi-step authentication setting region 920 displays a development division 1 set button 922 and an operation division 2 set button 924.

The title column 905 displays, for example, "property of user A."

The setting of the multi-step authentication for the individual user A is performed in response to an operation in an individual user multi-step authentication setting region 910. For example, if the new button 914 is selected, the types of authentication displayed in the authentication method display column 912 are selected in the order of the multi-step authentication, and the setting of the multi-step authentication for the user A is performed. If the copy button 916 is selected, the setting of the multi-step authentication for another user is displayed in the authentication method display column 912 and the contents of the authentication method display column 912 are edited to set the multi-step authentication for the user A.

If the development division 1 setting button 922 or the operation division 2 setting button 924 is selected, the screen transitions to a screen that is used to set the setting of the multi-step authentication not for the user A but for the tenant to which the user A belongs. Specifically, a screen 900 in FIG. 9B is displayed.

FIG. 9B illustrates the multi-step authentication setting screen for the tenant of the user. This is the display example displayed when the development division 1 setting button 922 is selected.

A screen 900 displays a title box 955, multi-phase authentication setting region 960, set button 970, and cancel button 975.

The screen 900 displays a first step authentication setting pulldown menu 962, second step authentication setting pulldown menu 964, third step authentication setting pulldown menu 966, and fourth step authentication setting pulldown menu 968.

A title box 955 displays, for example, a title "Multi-step authentication New setting." In this example, three-step authentication is used. The "ID/password" is set in the first step, the "IC card" is set in the second step, and the "fingerprint" is set in the third step. When the application is used, these settings are applied not only to the individual user A but also all users belonging to the development division 1 that is the tenant to which the user A belongs.

Figure 10:
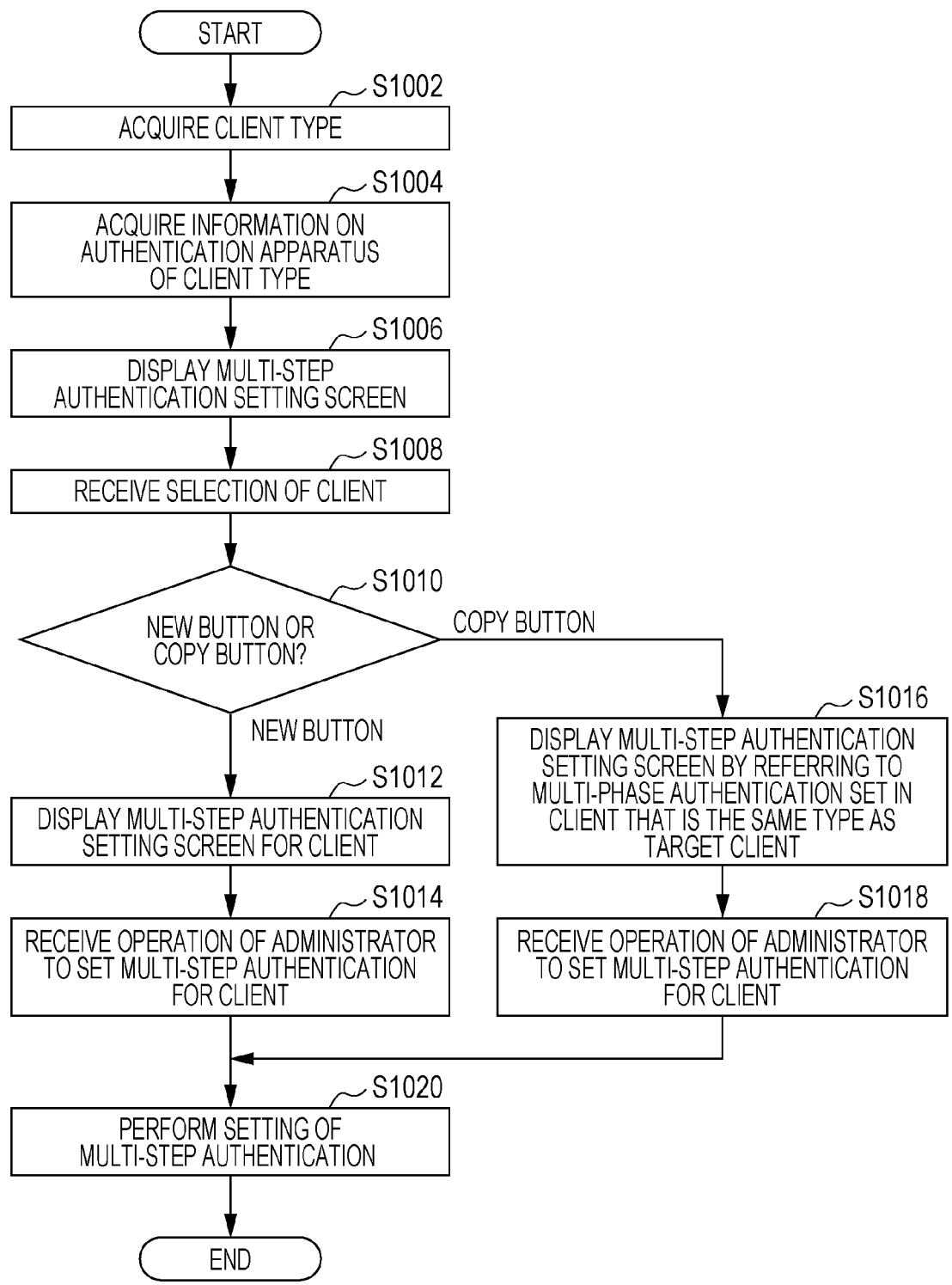
FIG. 10 is a flowchart illustrating a process example of the exemplary embodiment.

FIG. 10 is a flowchart illustrating a process example of the exemplary embodiment. The setting of the multi-step authentication is performed on the client of the user.

The process starts.

In step S1002, the type of the client is acquired. For example, information on a target user is acquired from the client management table 1100. The client management table 1100 is stored on the client information memory module 134.

FIG. 11 illustrates a data structure of the client management table 1100. The client management table 1100 includes a client ID column 1105, name column 1110, type column 1115, device authentication apparatus A column 1120, and device authentication apparatus B column 1125.

The client ID column 1105 stores information uniquely identifying a client (specifically, a client ID) in the exemplary embodiment. The name column 1110 stores the name of the client. The type column 1115 stores the type of the client. For example, the type of the client may be the type of the image processing apparatus 238 or the type of a browser installed on the user terminal 232. The device authentication apparatus A column 1120 stores information on an authentication device A mounted in the client. The authentication device A may be a keyboard to enter a user ID and password. The device authentication apparatus B column 1125 stores information on an authentication device B mounted in the client. The authentication device B may be an IC card reader. The authentication device B may also be a fingerprint reader or a camera for face authentication.

In step S1004, information on an authentication device of the client type is acquired.

In step S1006, the multi-step authentication setting screen is displayed.

In step S1008, the selection of the client is received.

In step S1010, a determination as to whether the new button or the copy button is selected is made. If the new button is selected, the process proceeds to step S1012 and if the copy button is selected, the process proceeds to step S1016.

In step S1012, the multi-step authentication setting screen for the client is displayed. In the screen, an authentication method performed by the authentication device installed in the client is displayed.

In step S1014, the operation of the administrator to set the multi-step authentication for the client is received.

In step S1016, the multi-step authentication setting screen is displayed by referring to the multi-step authentication set in another client that is of the same type as the target client. The client having the multi-step authentication set therein may be of the same type as the target client or of a type having a function similar to that of the target client. The screen displays an authentication method that is performed by an authentication device installed in the target client.

In step S1018, the operation of the administrator to set the multi-step authentication for the client is received.

In step S1020, the multi-step authentication is set.

The process ends.

A client authentication unit and authentication method management table 1200 is created in the process described in the flowchart in FIG. 10. The client authentication unit and authentication method management table 1200 is stored on the client and authentication method memory module 129.

FIG. 12 illustrates a data structure of the client authentication unit and authentication method management table 1200. The client authentication unit and authentication method management table 1200 includes an authentication unit column 1205, individual basis/type basis column 1210, number of steps column 1215, authentication method A column 1220, and authentication method B column 1225.

The authentication unit column 1205 stores an authentication unit. For example, the authentication unit is information uniquely identifying a client, or a type of the client (for example, including the type of a model of the client). The individual basis/type basis column 1210 stores information indicating whether the users are based on individual or type. The number of steps column 1215 stores the number of steps of authentication in the multi-step authentication. The authentication method A column 1220 stores the authentication method A in the first step. The authentication method B column 1225 stores the authentication method B in the second step. If three or more steps are used, columns identical to the authentication method A column 1220 (or the authentication method B column 1225) are added.

Figure 13B:
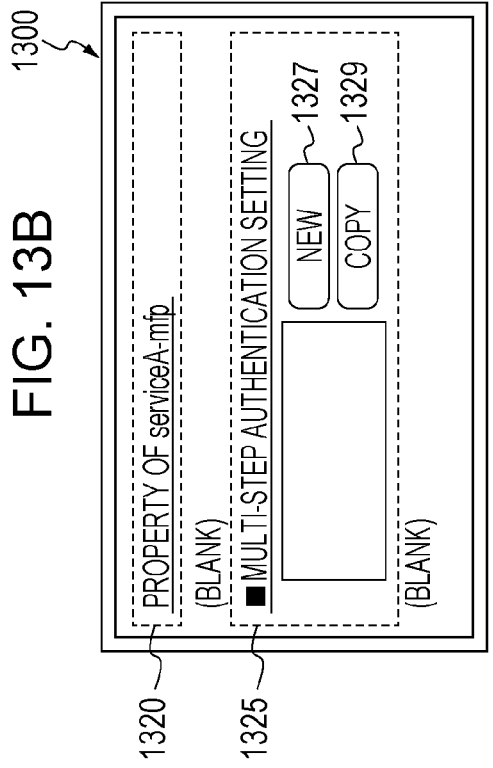
FIGS. 13A through 13D illustrate a process example of the exemplary embodiment.
Figure 13D:
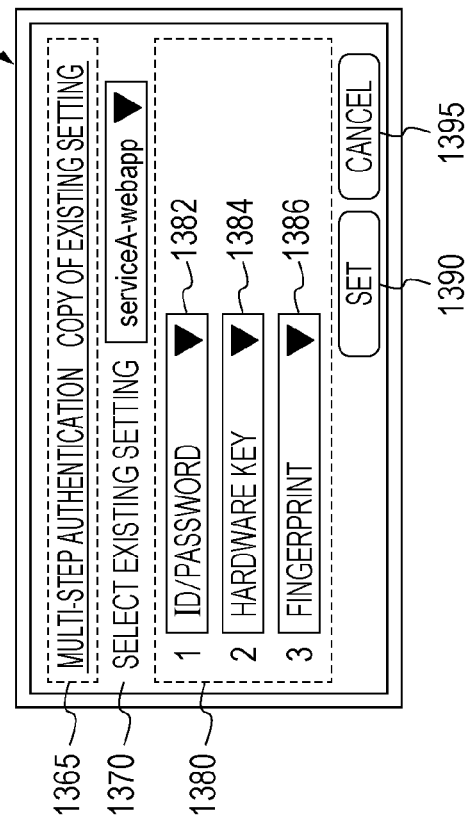
Figure 13A:
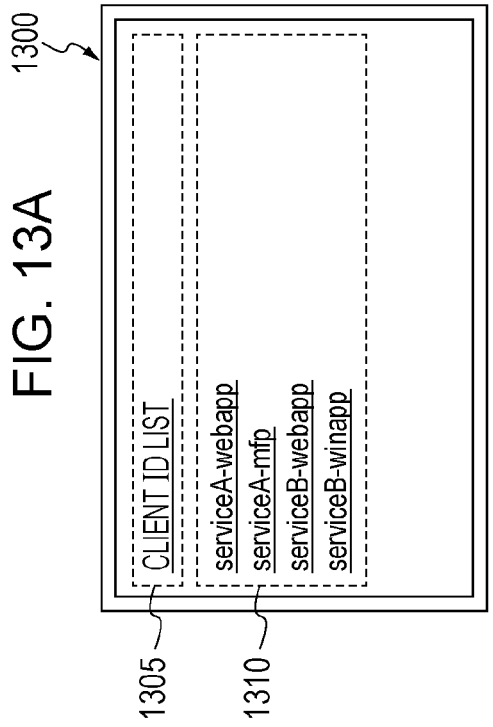

FIGS. 13A through 13D illustrate a process example of the exemplary embodiment. FIG. 13A illustrates the multi-step authentication setting screen for the client. A screen 1300 displays a title box 1305 and a client display region 1310. The title box 1305 displays, for example, a title "Client ID list."

The client display region 1310 displays, for example, the following information:

(1) "ServiceA-webapp" indicating a web application to use service A, (2) "ServiceA-mfp" indicating an application on the image processing apparatus 238 to use the service A, (3) "ServiceB-webapp" indicating a web application to use service B, (4) "ServiceB-winapp" indicating an application on the user terminal 232 to use the service B.

The web application is operable on each of the user terminal 232 and the image processing apparatus 238. In the information (1), (3), and (4), a personal computer, such as the user terminal 232, is a client. In the information (1), (2), and (3), a multi-function apparatus, such as the image processing apparatus 238, is a client.

If (2) "serviceA-mfp" is selected in response to user operation, a screen in FIG. 13B is displayed.

FIG. 13B illustrates the multi-step authentication setting screen for "serviceA-mfp".

The screen 1300 displays a title box 1320 and multi-step authentication setting region 1325. The title box 1320 displays, for example, a title "Property of serviceA-mfp."

Figure 13C:
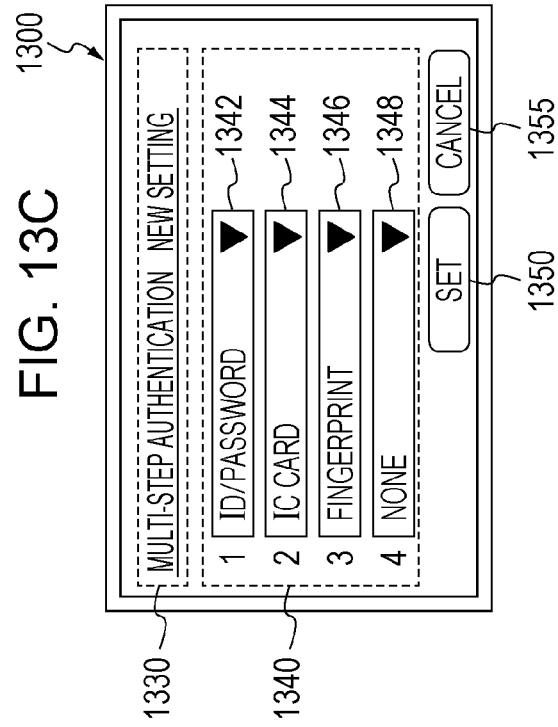

The multi-step authentication setting region 1325 displays a new button 1327 and copy button 1329. If the new button 1327 is selected in response to user operation, a screen in FIG. 13C is displayed. If the copy button 1329 is selected in response to user operation, a screen in FIG. 13D is displayed.

FIG. 13C illustrates the multi-step authentication setting screen displayed if the new button 1327 is selected.

The screen 1300 displays a title box 1330, multi-step authentication setting region 1340, set button 1350, and cancel button 1355.

The multi-step authentication setting region 1340 displays a first step authentication pulldown menu 1342, second step authentication pulldown menu 1344, third step authentication pulldown menu 1346, and fourth step authentication pulldown menu 1348.

The title box 1330 displays, for example, the title "Multi-step authentication New setting." This represents three steps. The "ID/password" is set in the first step, the "IC card" is set in the second step, and the "fingerprint" is set in the third step. These settings are applied to a user who is to use "serviceA-mfp" on the image processing apparatus 238. The authentication displayed on this menu corresponds to the authentication device mounted in the image processing apparatus 238. Specifically, the image processing apparatus 238 includes a key device to enter the ID/password, a card reader to read the IC card, a fingerprint reader to read the fingerprint, and other device. Since the image processing apparatus 238 does not include a camera performing face authentication, the face authentication is not listed on the menu.

FIG. 13D illustrates the multi-step authentication setting screen displayed if the copy button 1329 is selected. The screen 1300 displays a title box 1365, existing setting selection pulldown menu 1370, multi-step authentication setting region 1380, set button 1390, and cancel button 1395.

The multi-step authentication setting region 1380 displays a first step authentication setting pulldown menu 1382, second step authentication setting pulldown menu 1384, and third step authentication setting pulldown menu 1386.

The title box 1365 displays, for example, a title "Multi-step authentication Copy of existing setting."

In the existing setting selection pulldown menu 1370, "serviceA-webapp" of the multi-step authentication set on the image processing apparatus 238 is selected. Specifically, user interface is equalized in the authentication on the image processing apparatus 238 is equalized. In this example, three-step authentication is used. The "ID/password" is set in the first step, the "hardware key" is set in the second step, and the "fingerprint" is set in the third step. These settings are set in "serviceA-webapp" and are applied to a user who uses "serviceA-mfp" on the image processing apparatus 238. In the same way as described previously, the authentication displayed on the menu corresponds to the authentication device mounted on the image processing apparatus 238. Specifically, the image processing apparatus 238 includes a key device to enter the ID/password, a dongle connection port to read the hardware key, a fingerprint reader to detect the fingerprint, and other device.

Figure 14A:
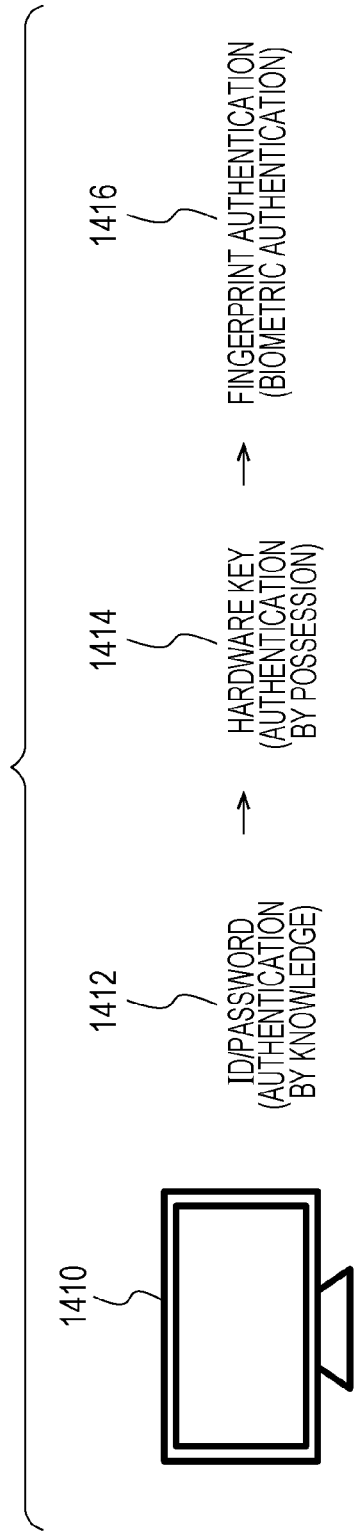
FIGS. 14A and 14B illustrate a process example of the exemplary embodiment.
Figure 14B:
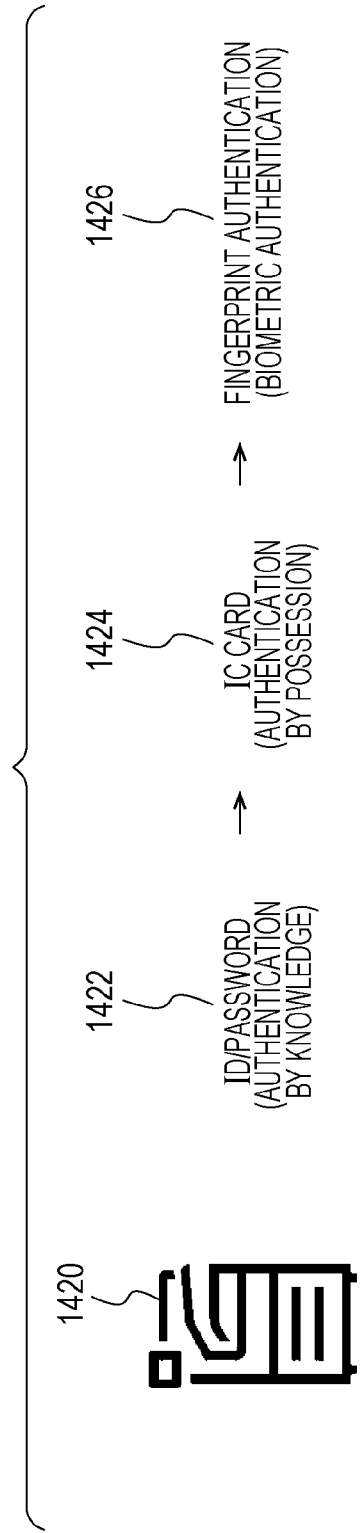

FIGS. 14A and 14B illustrates process examples of the exemplary embodiment. If a user terminal 1410 includes a key device, a dongle connection port, and a fingerprint reader, the user terminal 1410 may be configured to perform the multi-step authentication of the ID/password (authentication by knowledge) 1412, the hardware key (authentication by possession) 1414, the fingerprint authentication (biometric authentication) 1416 in that order.

If the user terminal 1410 includes a key device, a card reader, and a fingerprint reader, an image processing apparatus 1420 may be configured to perform the multi-step authentication of the ID/password (authentication by knowledge) 1422, the IC card (authentication by possession) 1424, the fingerprint authentication (biometric authentication) 1426 in that order.

Figure 15:
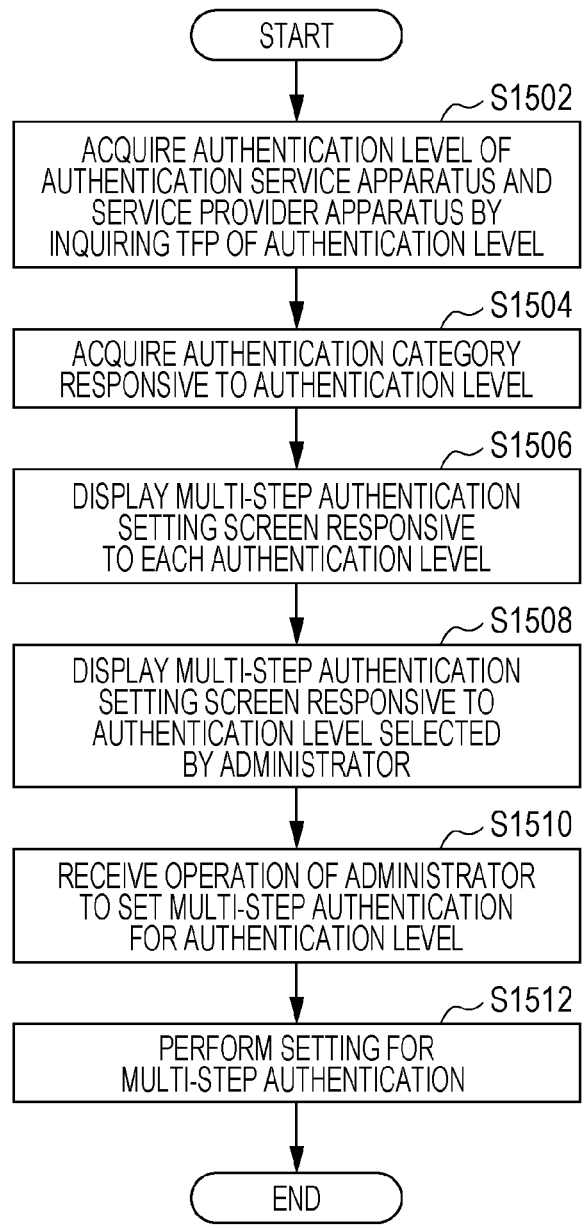
FIG. 15 is a flowchart illustrating a process example of the exemplary embodiment.

FIG. 15 is a flowchart illustrating a process example of the exemplary embodiment. In the process, the multi-step authentication is set using the trust framework provider (TFP).

The process starts.

In step S1502, TFP is inquired of the authentication levels of the authentication service apparatus 220 and the service provider apparatus 210 to acquire the authentication levels. The acquisition results are stored as an authentication service apparatus to authentication level table 1600 and a service provider apparatus to authentication level table 1650. The authentication service apparatus to authentication level table 1600 and the service provider apparatus to authentication level table 1650 are stored on the LOA level information memory module 136.

FIGS. 16A and 16B illustrate respectively a data structure of the authentication service apparatus to authentication level table 1600 and the service provider apparatus to authentication level table 1650.

FIG. 16A illustrates the data structure of the authentication service apparatus to authentication level table 1600. The authentication service apparatus to authentication level table 1600 includes an authentication service apparatus ID column 1605 and authentication level column 1610. The authentication service apparatus ID column 1605 stores information uniquely identifying an authentication service device (specifically, an authentication service apparatus ID). The authentication level column 1610 stores the authentication level of the authentication service device.

FIG. 16B illustrates the data structure of the service provider apparatus to authentication level table 1650. The service provider apparatus to authentication level table 1650 includes a service provider apparatus ID column 1655 and authentication level column 1660. According to the exemplary embodiment, the service provider apparatus ID column 1655 stores information uniquely identifying a service providing device (specifically, a service provider apparatus ID). The authentication level column 1660 stores the authentication level of the service provider apparatus.

In step S1504, a category of authentication corresponding to the authentication level is acquired. This step may be dependent on condition that the authentication level of the authentication service apparatus 220 and the authentication level of the service provider apparatus 210 acquired in step S1502 matches each other.

The three categories of authentication, namely, authentication by knowledge, authentication by possession, and biometric authentication, are used. For example, the following authentication levels are available: (1) authentication level 1 where one type of authentication is performed, (2) authentication level 2 where two-step authentication including the authentication by possession is performed, (3) authentication level 3 where two-step authentication including the biometric authentication is performed, and (4) authentication level 4 where three-step authentication including the authentication by possession and the biometric authentication is performed.

In step S1506, the multi-step authentication setting screen for each authentication level is displayed.

In step S1508, the multi-step authentication setting screen for the authentication level selected by the administrator is displayed. For example, the multi-step authentication setting screen is displayed such that the authentication setting is performed in accordance with an authentication device that is installed on the client performing authentication and agrees with the category of authentication acquired in step S1504.

In step S1510, the operation of the administrator is received to set the multi-step authentication for the authentication level.

In step S1512, the multi-step authentication is set. The process ends.

An authentication level and authentication method management table 1700 is created in accordance with the process described in the flowchart in FIG. 15. The authentication level and authentication method management table 1700 is stored on the LOA level and authentication method memory module 131.

FIG. 17 illustrates a data structure of the authentication level and authentication method management table 1700. The authentication level and authentication method management table 1700 includes an authentication level column 1705, number of steps column 1710, authentication method A column 1715, and authentication method B column 1720.

The authentication level column 1705 stores an authentication level. The number of steps column 1710 stores the number of steps in the multi-step authentication at that authentication level. The authentication method A column 1715 stores the authentication method A in the first step. The authentication method B column 1720 stores the authentication method B in the second step. If three or more steps are used, columns identical to the authentication method A column 1715 (or the authentication method B column 1720) are added.

FIGS. 18A through 18D illustrate a process example of the exemplary embodiment. FIG. 18A illustrates the multi-step authentication setting screen using the authentication level acquired from TFP.

A screen 1800 displays a title box 1805 and authentication level and multi-step authentication setting region 1810.

The authentication level and multi-step authentication setting region 1810 displays a level 1 setting region 1812, level 2 setting region 1814, level 3 setting region 1816, and level 4 setting region 1818.

The level 1 setting region 1812 displays a set button 1813. The level 2 setting region 1814 displays a set button 1815. The level 3 setting region 1816 displays the set button 1817. The level 4 setting region 1818 displays a set button 1819.

The title box 1805 displays, for example, "Setting of multi-step authentication (LOA)."

The level 1 setting region 1812 displays the authentication level 1 where the first step is "ID/password".

The level 2 setting region 1814 displays the authentication level 2 where the first step is "ID/password" and the second step is "IC card."

The level 3 setting region 1816 displays the authentication level 3 where the first step is "ID/password" and the second step is "fingerprint."

The level 4 setting region 1818 displays the authentication level 4 wherein the first step is "ID/password," the second step is "IC card," and the third step is "fingerprint".

FIG. 18B illustrates the multi-step authentication setting screen displayed if the set button 1819 in the level 4 setting region 1818 is selected in response to user operation.

The screen 1800 includes a title box 1855, multi-step authentication setting region 1860, set button 1870, and cancel button 1875.

The multi-step authentication setting region 1860 displays a first step authentication setting pulldown menu 1862, second step authentication setting pulldown menu 1864, and third step authentication setting pulldown menu 1866.

The title box 1855 displays, for example, a title "Multi-step authentication Setting of LOA Level 4." This is a three-step authentication. The first step is "ID/password," the second step is "IC card," and the third step is "fingerprint." The authentication on the menu supported by the authentication device mounted on the client used by the user may be selected. Specifically, the client may include the key device inputting the ID/password, a card reader reading the IC card, a fingerprint reader reading a fingerprint, and so on. Since the client is not equipped with a camera performing face authentication, the face authentication is not listed on the menu.

FIG. 18C illustrates a screen example that displays an attribute of the service A provided by the service provider apparatus 210.

The screen 1800 displays a title box 1880 and authentication level display region 1885. The title box 1880 displays, for example, a title "Property of serviceA." The authentication level display region 1885 displays, for example, "LOA authorized: Level 2" and indicates that the authentication level of the service A provided by the service provider apparatus 210 is "2." Specifically, to use the service A, the multi-step authentication preset for each level is performed.

Figure 19:
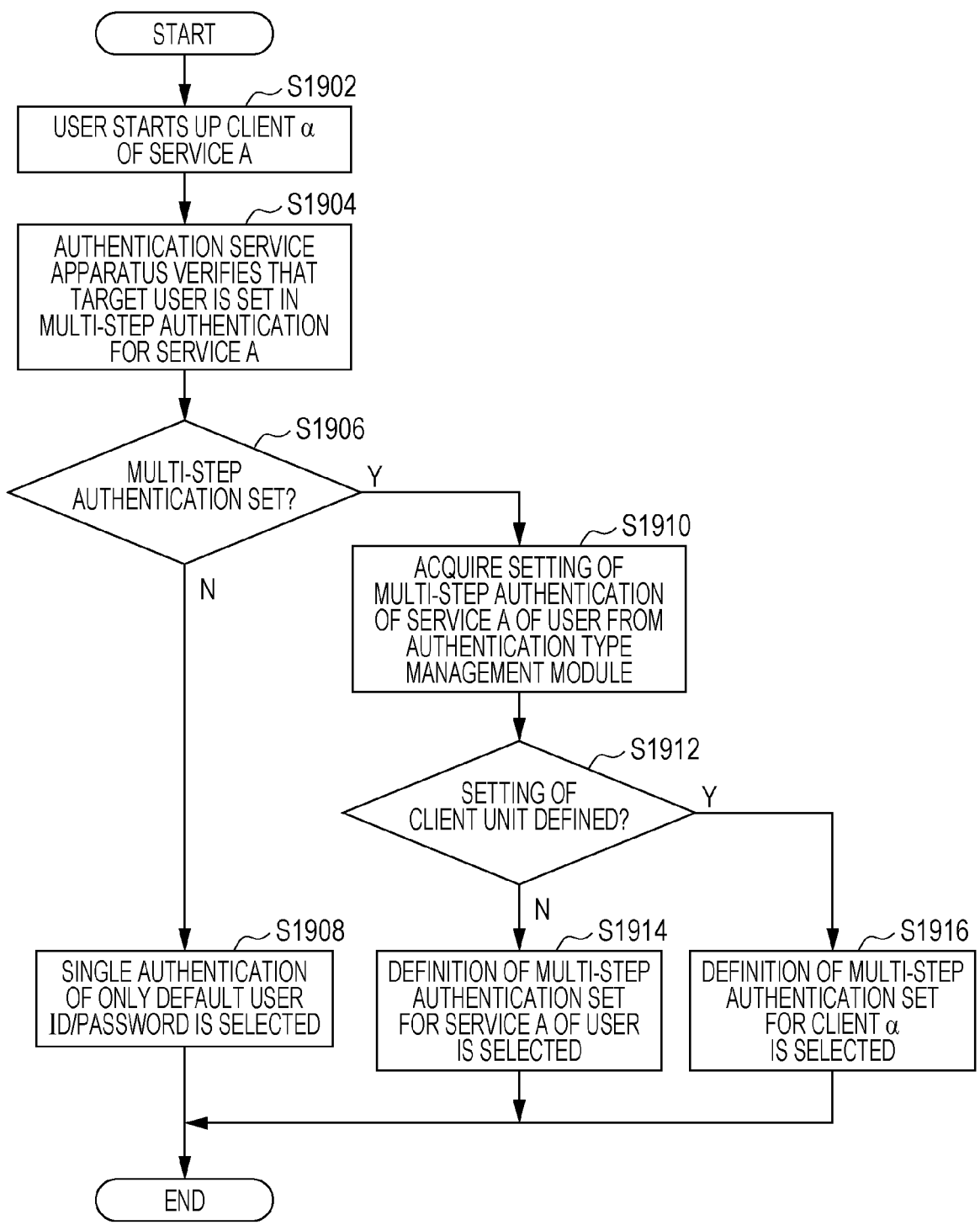
FIG. 19 is a flowchart illustrating a process example of the exemplary embodiment.

FIG. 19 is a flowchart illustrating a process example of the exemplary embodiment. The process determines the setting of the multi-step authentication on each client when a login user uses the service A.

The process starts.

In step S1902, the user starts up a client a to use the service A.

In step S1904, the authentication service apparatus 220 verifies that the multi-step authentication for the service A is set for a target user.

In step S1906, it is determined whether the multi-step authentication is set. If the multi-step authentication is set, the process proceeds to step S1910; otherwise, the process proceeds to step S1908.

In step S1908, a default user ID/password is selected as a single authentication. In this case, the authentication using the user ID/password is performed.

In step S1910, the setting of the multi-step authentication for the service A of the user is acquired from the authentication type management module 340.

In step S1912, it is determined whether the setting per client is defined. If the setting per client is defined, the process proceeds to step S1916; otherwise, the process proceeds to step S1914.

In step S1914, the definition of the multi-step authentication set for the service A of the user is selected. In this case, the multi-step authentication set for the service A of the user is to be performed. The setting of the multi-step authentication is performed on a tenant and if the user belongs to the tenant, the multi-step authentication set for that tenant is to be performed.

In step S1916, the definition of the multi-step authentication set for the client a is selected. In this case, the multi-step authentication set for the client a is to be performed. The process thus ends.

Figure 20:
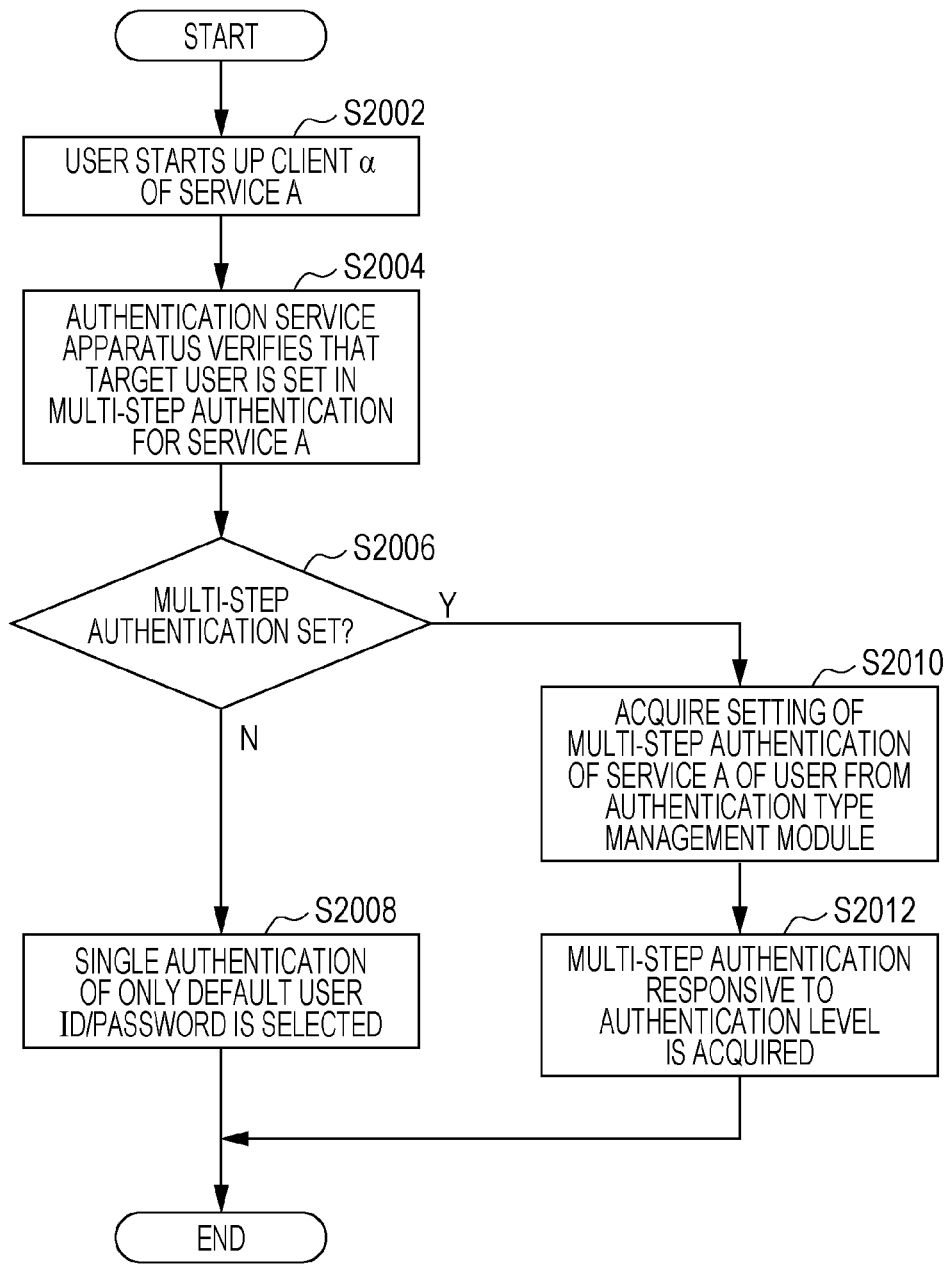
FIG. 20 is a flowchart illustrating a process example of the exemplary embodiment.

FIG. 20 is a flowchart illustrating a process example of the exemplary embodiment. The process determines the setting of the multi-step authentication using the authentication level.

The process starts.

In step S2002, the user starts up the client a to use the user service A.

In step S2004, the authentication service apparatus 220 verifies that the multi-step authentication is set for the service A for the target user.

In step S2006, it is determined whether the multi-step authentication is set. If the multi-step authentication is set, the process proceeds to step s2010; otherwise, the process proceeds to step S2008.

In step S2008, the default user ID/password is selected as a single authentication. In this case, the authentication using the user ID/password is performed.

In step S2010, the authentication level of the service A is acquired from the authentication level management apparatus 290.

In step S2012, the setting of the multi-step authentication responsive to the authentication level is acquired. The multi-step authentication responsive to the authentication of the service A is to be performed. The process thus ends.

The program described above may be provided in a recorded form on a recording medium or via a communication medium. The program described above may be construed as a computer readable non-transitory recording medium storing the program.

The computer readable non-transitory recording medium recording the program refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory storing, in an associated form, a unit of authentication and multi-step authentication corresponding to the unit,
wherein the unit of authentication comprises a minimum unit and a non-minimum unit,
wherein the non-minimum unit is at least one of a user group having a plurality of users, a plurality types of devices receiving inputs for authentication, and at least one level of assurance being used, and
wherein the minimum unit is at least one of an individual user, a device receiving an input for authentication, and no level of assurance being used; and
one or more processors configured to:
determine whether the unit of authentication is either the minimum unit or the non-minimum unit; and
when a type of the authentication of an authentication step in the multi-step authentication is to be set, display a unit of the type corresponding to the determined unit of authentication serving as a setting target on a display in a manner such that the unit of the type serving as the setting target is selectable.

2. The information processing apparatus according to claim 1, wherein if the unit of the authentication is a group constituted by users to which a user belongs, the memory stores, in an associated form, information on the user and information on the group of the user and the processor is configured to, when the type of the authentication in the authentication step in the multi-step authentication is to be set, display the group on the display in a manner such that the group is selectable.

3. The information processing apparatus according to claim 2, wherein, as the group, a group that is constituted by users who pay to a same billing destination when using a device and that is previously defined is used.

4. The information processing apparatus according to claim 1, wherein if the unit of the authentication is a type of a device performing authentication, the memory stores, in an associated form, information on the device and a function of the device for authentication and the processor is configured to, when the type of the authentication of the authentication step in the multi-step authentication is to be set, display the type of the authentication of the authentication step in a manner such that the type of the authentication is selectable in accordance with the function of the device.

5. The information processing apparatus according to claim 4, wherein the processor is configured to present, with a higher priority, the type of the authentication set in a service provided by the device.

6. The information processing apparatus according to claim 1, wherein if a first device performing authentication and a second device performing authorization are separate and the unit of the authentication is levels of assurance held by the first device and the second device, the memory stores, in an associated form, the level of assurance and the type of the authentication at the level of assurance and the processor is configured to, when the type of the authentication of the authentication step in the multi-step authentication is to be set, display the level of assurance in a manner such that the level of assurance is selectable.

7. The information processing apparatus according to claim 6, wherein the processor is configured to, when the authentication is to be performed, inquire a third-party organization of the level, acquire the level of assurance, and set the type of the authentication corresponding to the acquired level of assurance.

8. The information processing apparatus according to claim 1, wherein the type of the authentication is a category of the authentication and the processor is configured to, if the category of the authentication is selected, set the type of the authentication included in the category of the authentication in accordance with a device that performs authentication.

9. A non-transitory computer readable medium storing a program causing a computer to execute a process for processing information, the process comprising:
storing, in an associated form, a unit of authentication and multi-step authentication corresponding to the unit,
wherein the unit of authentication comprises a minimum unit and a non-minimum unit,
wherein the non-minimum unit is at least one of a user group having a plurality of users, a plurality types of devices receiving inputs for authentication, and at least one level of assurance being used, and
wherein the minimum unit is at least one of an individual user, a device receiving an input for authentication, and no level of assurance being used;
determining whether the unit of authentication is either the minimum unit or the non-minimum unit; and
when a type of the authentication of an authentication step in the multi-step authentication to be set, displaying a unit of the type corresponding to the determined unit of authentication serving as a setting target on a display in a manner such that the unit of the type serving as the setting target is selectable.

10. An information processing apparatus comprising:
memory means for storing, in an associated form, a unit of authentication and multi-step authentication corresponding to the unit;
wherein the unit of authentication comprises a minimum unit and a non-minimum unit,
wherein the non-minimum unit is at least one of a user group having a plurality of users, a plurality types of devices receiving inputs for authentication, and at least one level of assurance being used, and
wherein the minimum unit is at least one of an individual user, a device receiving an input for authentication, and no level of assurance being used; and
one or more processor means for determining whether the unit of authentication is either the minimum unit or the non-minimum unit, when a type of the authentication of an authentication step in the multi-step authentication is to be set, and for displaying a unit of the type corresponding to the determined unit of authentication serving as a setting target on a display in a manner such that the unit of the type serving as the setting target is selectable.

* * * * *